(12) United States Patent
Peng

(10) Patent No.: US 6,501,228 B2
(45) Date of Patent: Dec. 31, 2002

(54) FULL-WAVE DRIVING CIRCUIT FOR MULTIPLE ELECTROLUMINESCENT CELLS

(75) Inventor: Jacky Peng, Chung Ho (TW)

(73) Assignee: Semisilicon Technology Corp., Taipei (TW)

( * ) Notice: Subject to any disclaimer, the term of this patent is extended or adjusted under 35 U.S.C. 154(b) by 0 days.

(21) Appl. No.: 09/818,681

(22) Filed: Mar. 28, 2001

(65) Prior Publication Data

US 2002/0140361 A1 Oct. 3, 2002

(51) Int. Cl.[7] .................................................. G09G 3/10
(52) U.S. Cl. ................................ 315/169.3; 315/169.1; 315/226; 315/205; 315/DIG. 7
(58) Field of Search .......................... 315/169.3, 209 R, 315/169.1, 176, 226, 205, 246, DIG. 7

(56) References Cited

U.S. PATENT DOCUMENTS 5,293,098 A * 3/1994 Brownell .................. 315/169.3
5,418,434 A * 5/1995 Kamens et al. .......... 315/169.3
5,483,503 A * 1/1996 Kimball .................... 315/169.3
5,502,357 A * 3/1996 Kimball ........................ 315/167

* cited by examiner

Primary Examiner—Haissa Philogene
(74) Attorney, Agent, or Firm—Bacon & Thomas

(57) ABSTRACT

A full-wave driving circuit for multiple electroluminescent lamps includes circuitry at a collective first end of the electroluminescent lamps for boosting of both positive and negative waves, and control elements at second ends of the electroluminescent lamps for turning on/off individual lamps at different times, whereby single or multiple electroluminescent lamps can be driven to flash at the same time.

3 Claims, 9 Drawing Sheets

FULL-WAVE DRIVING CIRCUIT FOR MULTIPLE ELECTROLUMINESCENT CELLS

BACKGROUND OF THE INVENTION

The present invention is related to a full-wave driving circuit for multiple electroluminescent lamps. The full-wave driving circuit is able to drive single or multiple electroluminescent lamps to flash at the same time.

Various kinds of electroluminescent lamps have been applied to may fields. The existing A.C. boosting circuits for driving [a] electroluminescent lamps can be substantially divided into two kinds as follows:

The first utilizes half-wave technique (as shown in FIG. 1A) or transformer for driving the electroluminescent lamp or element. The half-wave technique has a greatest weakness of insufficient illumination. With respect to the transformer, the electroluminescent lamp itself can act as a capacitor which works with the inductance of the transformer, resistors, capacitors and transistors to produce an oscillating signal as the input of the primary terminal of the transformer. The oscillating signal is converted into high voltage A.C. signal at secondary terminal for driving the electroluminescent lamp. Such method can drive the electroluminescent lamp to provide high illumination. However, there are still shortcomings exiting in such method. For example, great electricity is consumed, it is hard to control the quality of the transformer, the whole circuit will expend large space, the manufacturing cost is higher, and it is difficult to mass-produce.

The second utilizes full-wave driver or driving IC to provide signal-switching transistor for driving the electroluminescent lamp (as shown in FIG. 1B). According to the principle that an inductor or a coil is able to store energy, when the transistor is rapidly turned off, the inductor or coil instantaneously discharges the energy to produce instantaneous high voltage. The energy is stored in the electroluminescent lamp via a diode. Such procedure is repeated. After a period of time, another path is energized to produce high voltage signal. Accordingly, high voltage signals are alternately produced at two terminals of the electroluminescent lamp. With one terminal as reference point, the full wave high voltage signal is produced at the other terminal. The electroluminescent lamp driven by such method can improve the shortcoming of the above driving method by way of transformer. However, it will be relatively hard to drive multiple electroluminescent lamps to flash and the circuit design will be more complicated. Also, the components of the circuit are increased and the manufacturing procedure is more difficult.

SUMMARY OF THE INVENTION

It is therefore a primary object of the present invention to provide a full-wave driving circuit for multiple electroluminescent lamps. The operating voltage is boosted via a circuit structure composed of the coil, transistors, diodes and switches, whereby the circuit structure serves to drive single or multiple electroluminescent lamps to flash at the same time.

It is a further object of the present invention to provide the above full-wave driving circuit for multiple electroluminescent lamps, by which the illumination of the electroluminescent cells is enhanced. The volume of the driving circuit is smaller than that of the conventional driving circuit and the power consumption is lowered.

The present invention can be best understood through the following description and accompanying drawings wherein:

DETAILED DESCRIPTION OF THE PREFERRED EMBODIMENT

Figure 1A:
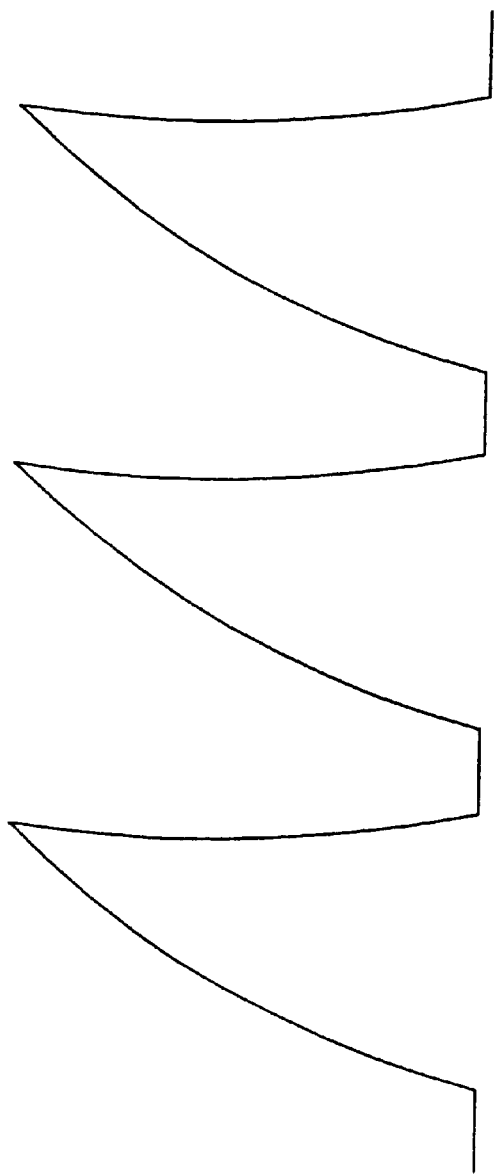
FIG. 1A is a diagram of half-wave boosting of a conventional driving waveform.
Figure 1B:
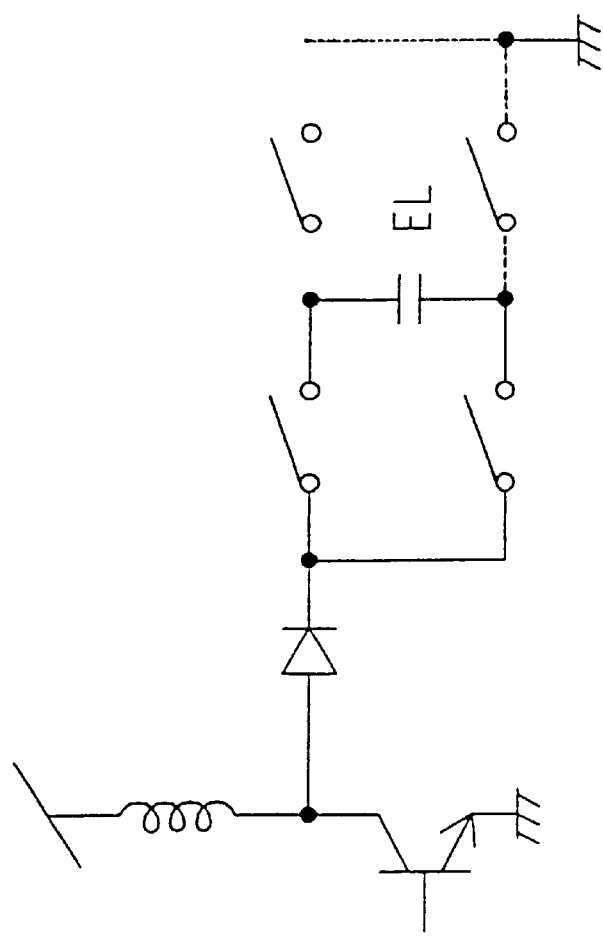
FIG. 1B is a circuit diagram of a conventional full-wave driver or driving IC structure.
Figure 2A:
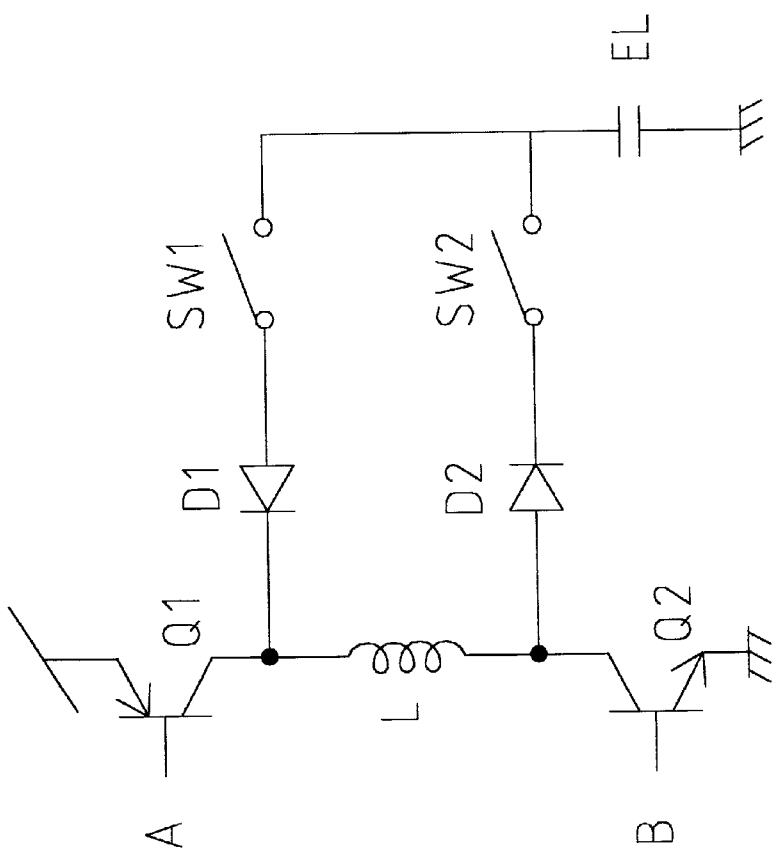
FIG. 2A is a circuit diagram of the full-wave driving circuit for driving electroluminescent lamps.
Figure 2:
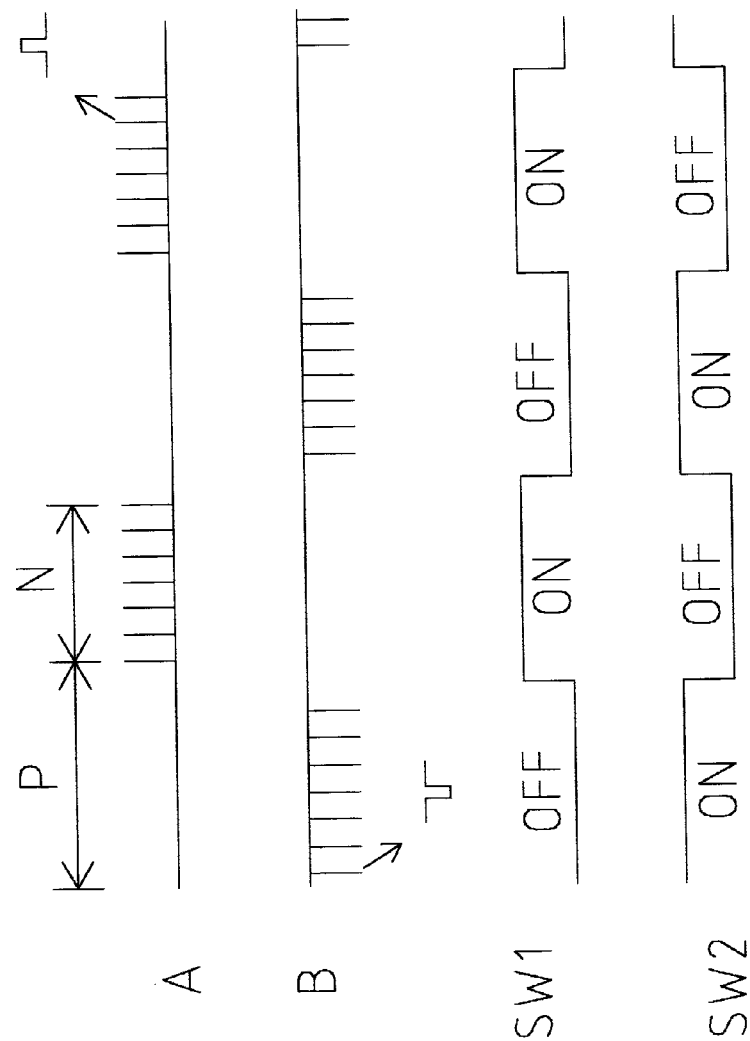
FIG. 2B is a timing diagram according to FIG. 2A.

Please refer to FIG. 2A. The full-wave driving circuit for multiple electroluminescent lamps of the present invention includes a coil L, transistors Q1, Q2, diodes D1, D2, switches SW1, SW2 and an electroluminescent lamp EL.

As shown in FIG. 2B, during time period P, A is low voltage (0V), Q1 is energized, B is a constant frequency signal and SW1 is off. Therefore, the path through SW1 and diode D1 to coil L is shut off. That is, SW2 is on to form the circuit of FIG. 3A, which is a common half-wave boosting circuit for driving the electroluminescent lamp or element EL. In the circuit, point H can be boosted to a high voltage signal. The voltage depends on the break-down voltage of the diode D2. With IN4148 exemplified, the voltage can be boosted to about 150V.

Accordingly, when time period P ends and time period N starts, A becomes a constant frequency signal, while B is kept at a high voltage (such as 3V or 1.5V) so that transistor Q2 is always energized. The SW1 is on, while SW2 is off so that another half-wave boosting circuit is formed as shown in FIG. 3B.

Figure 3:
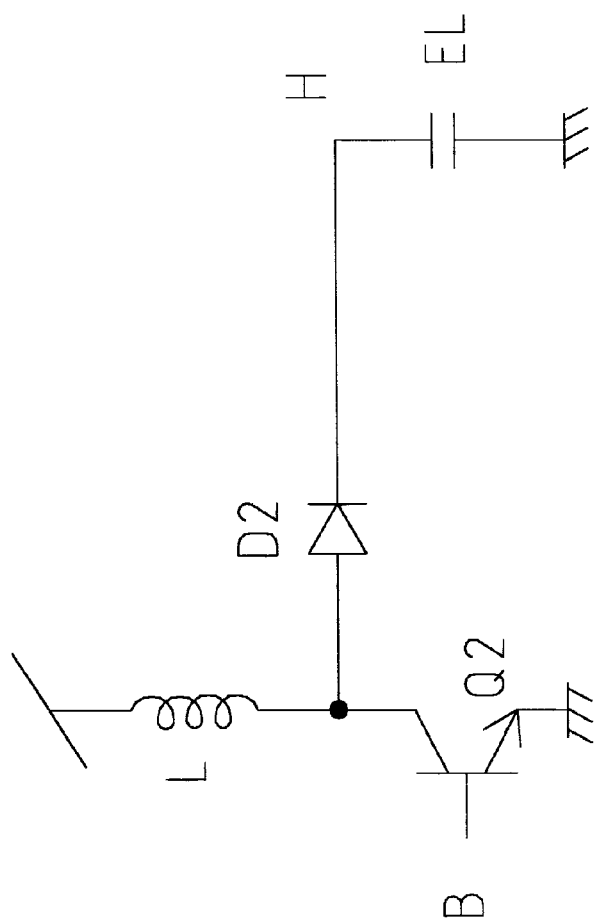
FIG. 3A is a circuit diagram of a part of the circuit of FIG. 2A.
FIG. 3B is a circuit diagram of another part of the circuit of FIG. 2A.
FIG. 3C is a timing diagram according to FIG. 2B.
Figure 3:
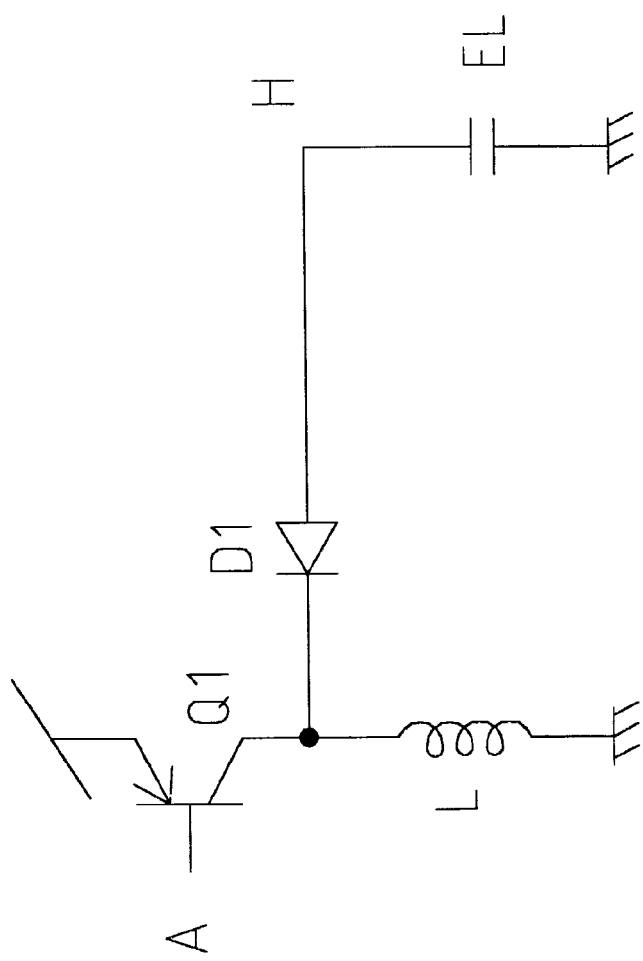
Figure 3:
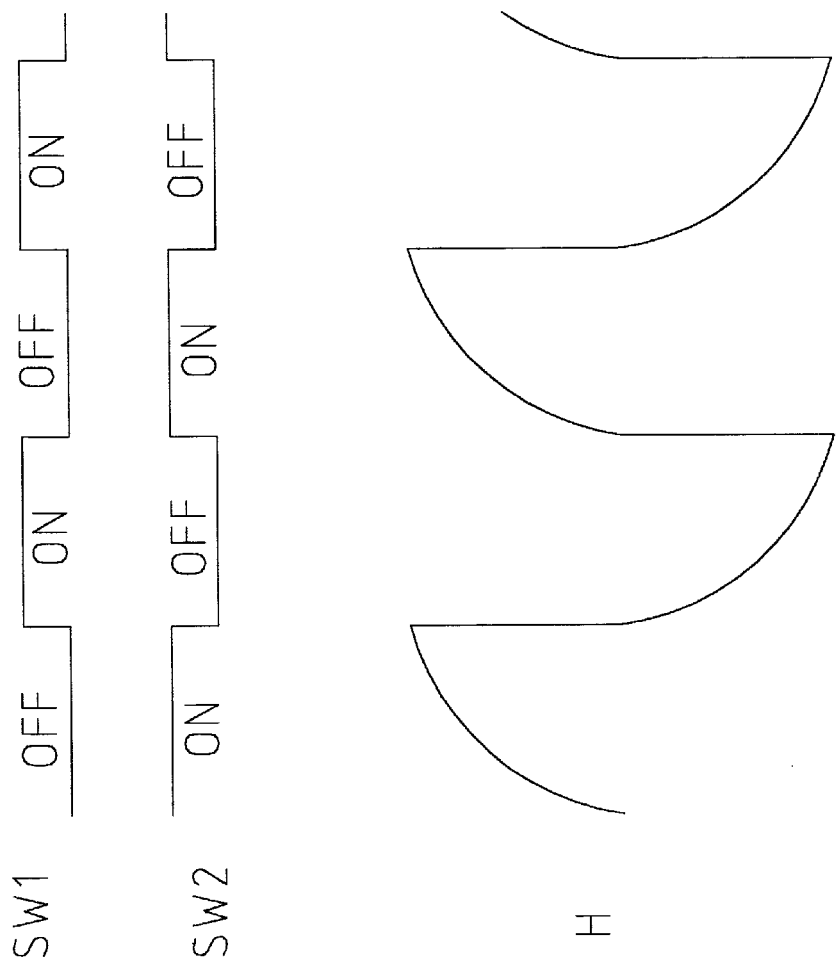

Further referring to FIGS. 3B and 3C, at this moment, the voltage of point H can drop to a negative high voltage signal. Similarly, the point H at which the voltage drops to a negative high voltage depends on the diode D1.

Figure 4:
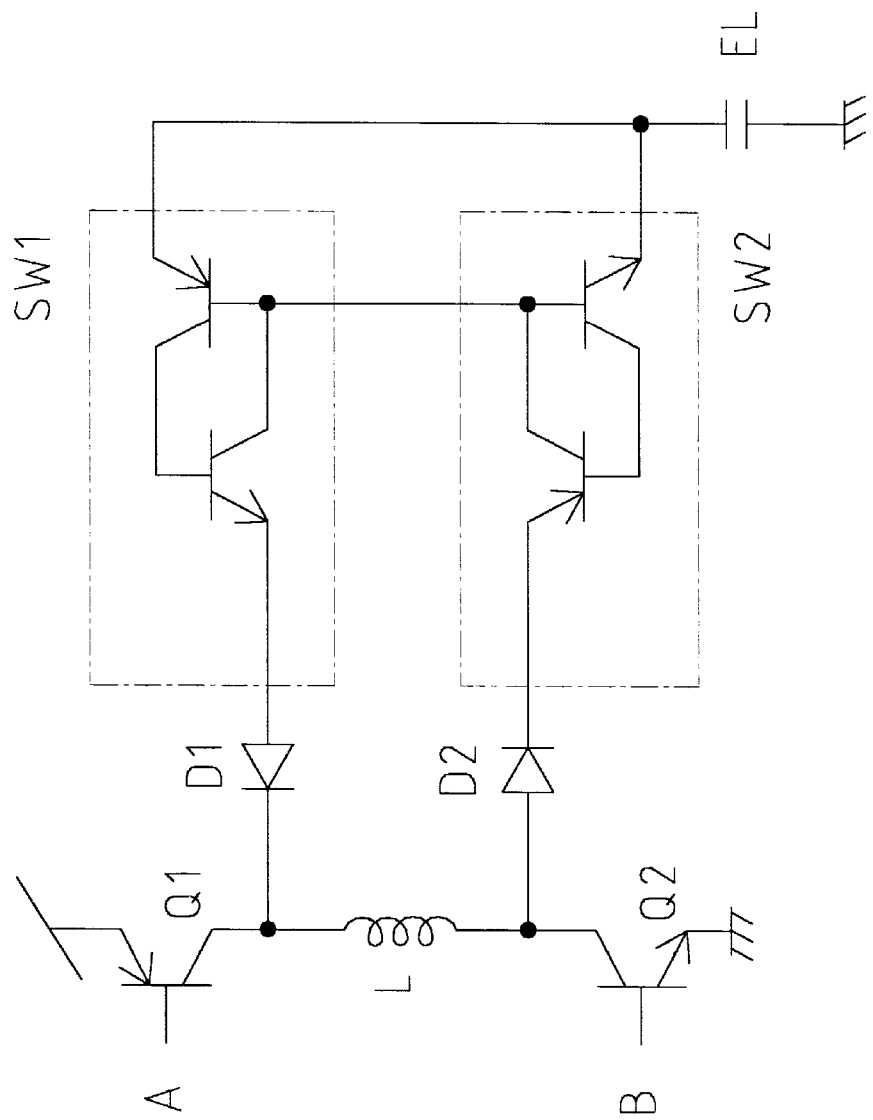
FIG. 4 is a circuit diagram of an application of the present invention.

According to the above basic circuit structure, in practical application, referring to FIG. 4, the signal of the circuit itself controls switching on/off of SW1, SW2 so that the application of the circuit is very simple.

Figure 5:
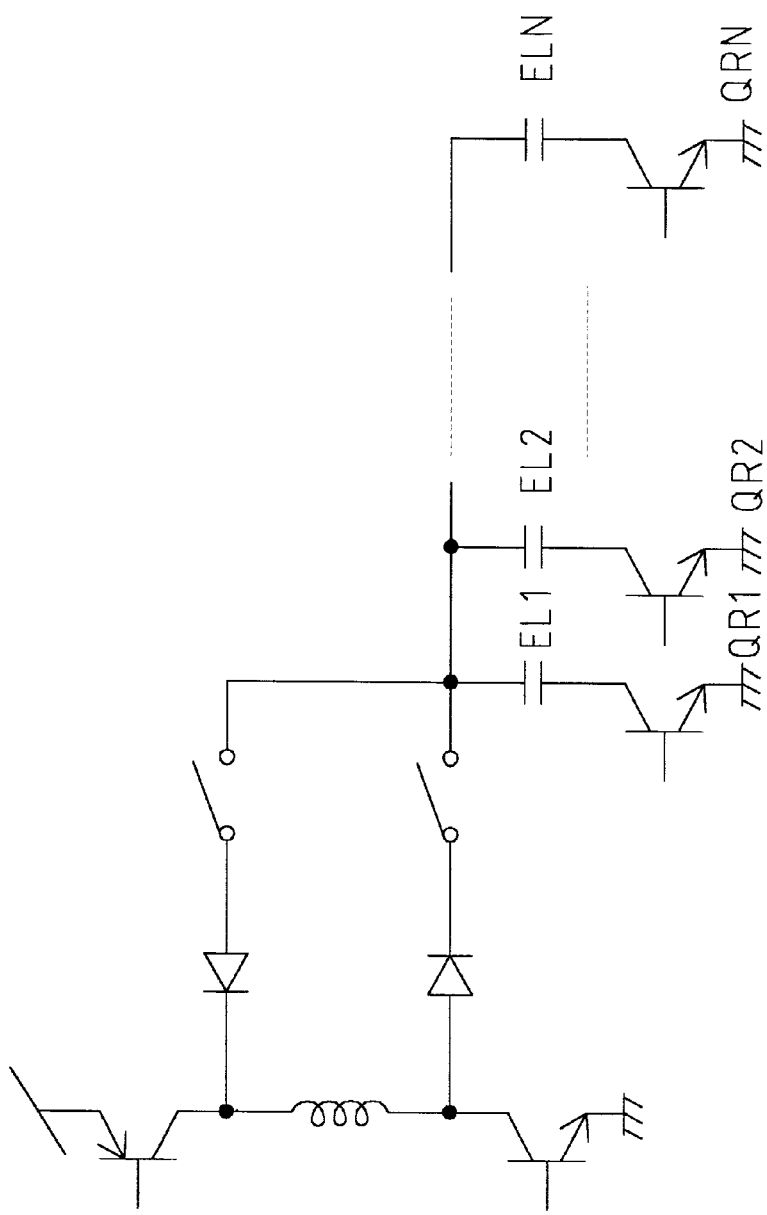
FIG. 5 is a circuit diagram derived from the circuit of FIG. 4, which serves to drive multiple electroluminescent lamps.

The above circuit structure can be used to drive multiple electroluminescent lamps or elements EL at the same time. Further referring to FIG. 5, the turning on/off of QR1~QRN is controlled at different times, whereby single or multiple electroluminescent lamps EL1~ELN can be lit up at the same time in full-wave pattern.

The above embodiment is only used to illustrate the present invention, not intended to limit the scope thereof. Many modifications of the above embodiment can be made without departing from the spirit of the present invention.

What is claimed is:

1. An electroluminescent lamp device, comprising a charge pumping circuit at a first end of at least one electroluminescent element, said charge pumping circuit including two half-wave driving circuits which together form a full wave driving circuit, each half-wave driving circuit including a transistor, a diode, a switch, said at least one electroluminescent element, and a shared coil connected in series between respective said transistors, and said electroluminescent device further comprising a transistor switch connected to a second end of the at least one electroluminescent element, wherein a low voltage DC signal is converted to a high voltage AC signal for causing illumination of the at least one electroluminescent element through the charge pumping circuit, and wherein brightness is regulated by the transistor switch at the second end of the electroluminescent element.

2. The electroluminescent lamp device of claim 1, wherein said switches are composed of four transistors assembled into two separate switches having control inputs coupled together so as to enable said separate switches controlled by each other mutually.

3. The electroluminescent lamp device of claim 1, wherein said transistor switches are turned on and off to control the brightness of the electroluminescent device with simultaneous or separate time control.

* * * * *